United States Patent Office 3,164,054
Patented Jan. 5, 1965

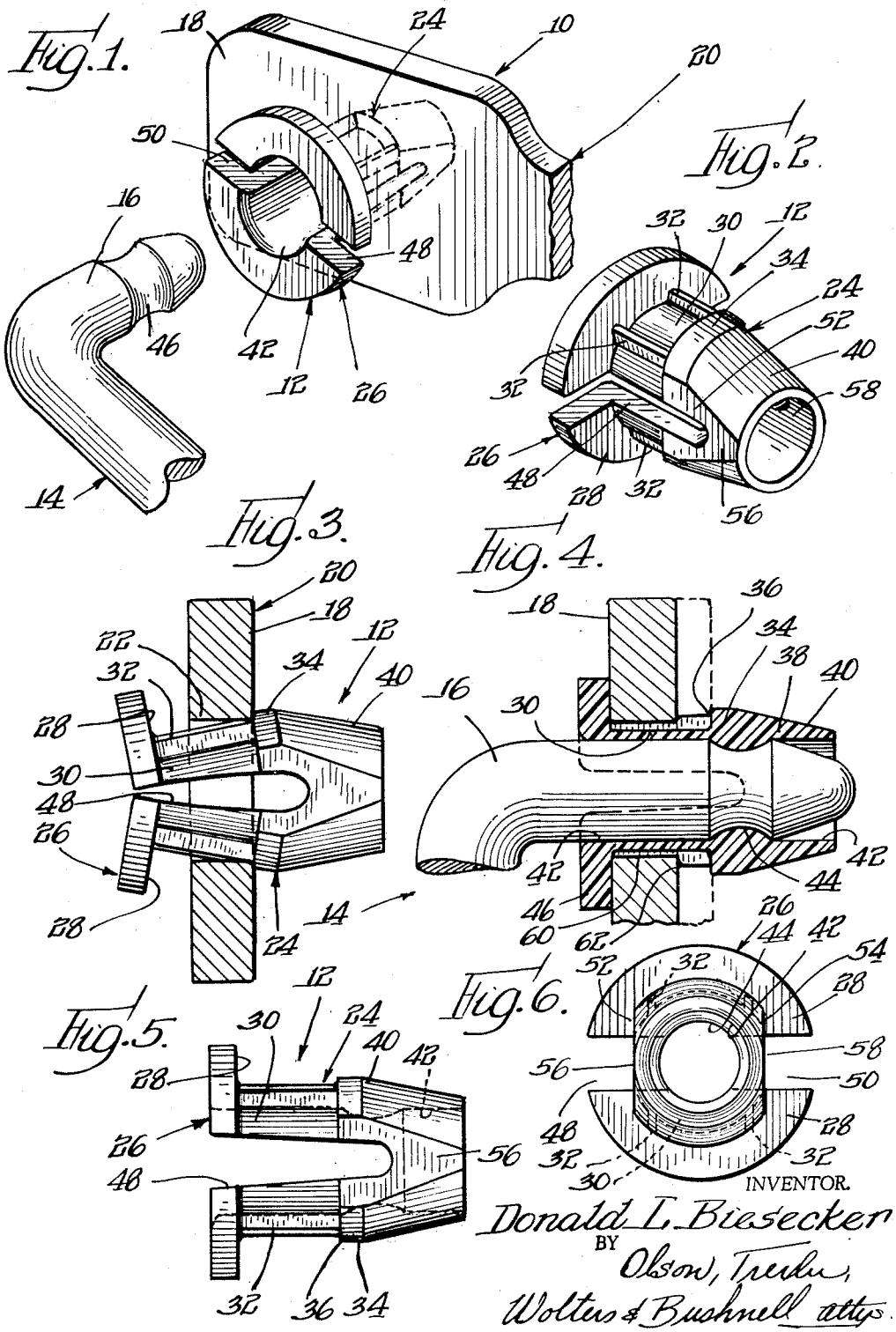

3,164,054
BUSHING WITH RIB AND SHOULDER MEANS
Donald L. Biesecker, Chicago, Ill., assignor to Illinois Tool Works Inc., Chicago, Ill., a corporation of Delaware
Filed Apr. 13, 1962, Ser. No. 187,401
3 Claims. (Cl. 85—8.8)

The present invention relates to a novel fastening device, and more specifically to a novel anchor member or bushing adapted to be applied to an apertured workpiece.

While numerous uses for devices of the type contemplated herein will suggest themselves, such devices are particularly suitable for connecting a first workpiece or article of manufacture having a shank or stud portion with a second apertured workpiece. Merely by way of example it is noted that devices of the type contemplated herein may be used for pivotally joining a connecting rod or similar element to an apertured end portion of a link or lever element in a variety of control or linkage systems.

An important object of the present invention is to provide a novel fastening device or bushing especially suitable for application to an apertured workpiece or structure regardless of variations in either thickness of the work structure or the diameter of the aperture within, of course, predetermined limits.

Another object of the present invention is to provide a novel fastening device or bushing which may be easily applied to an apertured workpiece and which will thereafter be positively retained against removal from the workpiece.

A more specific object of the present invention is to provide a novel fastening device or anchor member adapted to be applied to an apertured workpiece and adapted to receive and retain a second workpiece, which device is constructed for increasing the security of its connection with the apertured workpiece in response to forces tending to disassemble the second workpiece.

A further specific object of the present invention is to provide a novel fastening device or bushing of the above described type which is capable of securely retaining a shank or stud portion of a workpiece while at the same time permitting such a shank or stud portion to pivot or rotate about its axis.

A further object of the present invention is to provide a novel fastening device or bushing of the above described type which may be economically manufactured and assembled and which may be readily formed in one piece from suitable tough resilient materials.

Other objects and advantages of the present invention will become apparent from the following description and the accompanying drawing wherein:

FIG. 1 is a partially exploded view showing an assembly including a fastening device or bushing incorporating features of the present invention;

FIG. 2 is another perspective view showing a fastener device or bushing incorporating features of the present invention;

FIG. 3 is a partial sectional view showing the novel fastening device or bushing partially assembled with an apertured workpiece;

FIG. 4 is a partial sectional view showing a completed assembly;

FIG. 5 is a side elevational view showing a fastener device or bushing incorporating features of the present invention; and FIG. 6 is an entering end view of the novel fastener device or bushing.

Referring now more specifically to the drawings where-in like parts are designated by the same numerals throughout the various figures, an assembly 10 is shown in FIGS. 1 and 4 which includes a fastening device or bushing 12 incorporating features of the present invention. As previously indicated such an assembly may include a wide variety of workpieces which may take various forms and serve widely different functions. Merely by way of example, it is contemplated that the assembly 10 may include a first workpiece or article of manufacture 14 in the form of a connecting rod or similar element having a shank or stud portion 16, which is to be connected with a flattened end portion 18 of a second workpiece 20 which may be a lever or link in a control mechanism. An aperture 22 is provided through the flattened end portion of the workpiece 20 for accommodating the bushing 12.

The device 12 is formed in one piece and is preferably molded from a tough resilient plastic material such as nlyon. The device 12 comprises an elongtaed shank portion 24 adapted to extend through the workpiece aperture 22. A head portion 26 is integrally joined with a trailing end of a shank portion 24 and presents a radially extending clamping face 28 adapted to overlie and engage one side of the workpiece when the device is assembled with the workpiece as shown in FIGS. 1 and 4.

It will be appreciated that as a result of manufacturing tolerances and other causes, the thickness of the workpiece and the diameter of the workpiece aperture may vary considerably from workpiece to workpiece. In accordance with the present invention, the device 12 is constructed so that it is adapted to be applied securely and snugly or without undue looseness or play with workpieces of various thicknesses and various aperture diameters. More specifically, the shank portion 24 includes a first section 30 having a length equal to the thickness of the thickest workpiece with which the device is adapted to be assembled. In FIG. 4 the workpiece portion 18 is shown in solid lines with a thickness substantially less than the length of the shank section 30 and in broken lines with a thickness which the maximum that can be accommodated by the device.

The shank section 30 has a predetermined outside diameter substantially throughout its length, which diameter is about equal to or smaller than the diameter of the workpiece aperture 22. Circumferentially narrow axially extending ribs 32 are spaced around the periphery of the shank section 30 and project laterally or radially outwardly from the shank section 30. The radial extent of the ribs 32 is such that an imaginary circle defined by their outer edges has a diameter substantially greater than the outside diameter of the shank section 30 and greater than the diameter of the workpiece apertue 22. When the device is applied to the apertured workpiece, the ribs 32 are adapted to be deformed in the manner described below for promoting a secure and snug fit with the apertured workpiece. The shank portion 24 is provided with a radially thickened shoulder section 34 which presents a relatively rigid abutment or shoulder surface 36 extending generally radially outwardly from the outer or entering end of the shank section 30. The shoulder surface 36 is of greater radial extent than the ribs 32 and is adapted to overlie the surface of the workpiece 20 opposite from the head portion 26 for resisting withdrawal of the device 12 from the workpiece aperture. Preferably the device is provided with a tapering entering end section 38 having converging surfaces 40 extending from a shoulder section 34 for facilitating initial entry of the device into the workpiece aperture.

In order to accommodate the shank or stud portion 16 of the workpiece 14, the device 12 has a central axially extending bore 42 therethrough. The bore is defined by a smooth generally cylindrical wall having a diameter substantially equal to the diameter of the shank or stud portion 16. An annular rib 44 projects inwardly from the wall of the bore 42 for entry into an annular groove 46 formed in the stud or shank portion 16 as shown in FIG. 4. The rib 44 serves positively to retain the shank or stud portion 16 against a withdrawal from the bushing 12 while at the same time the shank portion 16 is free to pivot or rotate within the bushing.

In order to promote radial collapsing and expansion of the shank portion 24 during assembly of the various parts with respect to each other, slots 48 and 50 are formed in opposite sides of the device. As shown in the drawings, the slots 48 and 50 extend through and divide the head portion 26. The slots also extend through and divide the shank sections 30 and 34 but terminate short of the extremity of the entering end portion 38. Opposite sides of the entering end portion 38 are relieved or formed with flat surfaces 52 and 54 in alignment with the slots 48 and 50, which surfaces are generally parallel to the longitudinal axis of the device. As a result the opposite portions of the shank which are separated by the slots are connected by relatively thin yieldable wall sections 56 and 58 between the ends of the slots and the terminal edge of the shank. This construction further facilitates radial collapsing and expansion of the shank during assembly of the parts.

During assembly of the fastener device or bushing 12 with the apertured workpiece, the peripheral surfaces of the entering end portion and the shoulder section 34 engage opposite edges of the workpiece aperture 22. Since the diameter of the shoulder section 34 is greater than the diameter of the aperture 22, the edges of the aperture force the opposite side portions of the shank radially inwardly and cause the shank to bend around the relatively thin yieldable connecting wall sections 56 and 58 as shown in FIG. 3. When the shank portion has been collapsed in this manner, the shank section 30 and the ribs 32 thereon can easily pass through the workpiece aperture. In this connection it may be noted that the relatively rigid shoulder section 34 is capable of accommodating the pressures required to cause collapsing of the shank portion and thus serves to protect the relatively easily deformable ribs 32 against premature deflection during assembly of the device 12 with the apertured workpiece.

After the fastening device or bushing 12 has been inserted into the workpiece aperture 22 sufficiently so that the head portion 26 is positioned substantially against the workpiece, the shank or stud element 16 is inserted into the bore until the groove 46 is engaged with the rib 44. An entering end portion 58 of the shank element 16 is tapered in the manner shown to facilitate entry into the bore. As the element 16 is moved into the bore 42, the opposite side elements of the shank portion 24 are radially expanded or spread apart from the position shown in FIG. 3 to the position shown in FIG. 4. During this expansion of the shank portion 24, the ribs 32 are positively forced against the edge of the workpiece aperture 22 so that portions 60 of the ribs which directly engage the aperture edge are deformed and compressed whereby shoulders 62 are formed behind the apertured workpiece at the junctions between the compressed portions of the ribs and the remaining portions of the ribs. The ribs thus serve to engage the workpiece and restrain the bushing against both radial and axial movement relative to the workpiece. In the event either of an axially directed overload applied to the device which might cause collapsing of the shoulder surfaces 62 or of application of the device to a workpiece having a thickness shown in broken lines in FIG. 4, the relatively rigid shoulder surface 36 presented by the shoulder section 34 serves for overlying the back side of the apertured workpiece and preventing disassembly of the bushing from the apertured workpiece. Furthermore, it is to be noted that the rib 44, while being located primarily axially outwardly from the shoulder surface 36, is at least partially radially aligned with the shoulder section 34. Thus any tendency for the shank element 16 to move outwardly from the bore creates a camming action between the shank element 16 and the rib 44 which tends to expand the shoulder section 34 and even more positively support the shoulder surface 36 for engagement with the back of the apertured workpiece.

While the preferred embodiment of the present invention has been shown and described herein, it is obvious that many structural details may be changed without departing from the spirit and scope of the appended claims.

The invention is claimed as follows:

1. A device of the type described for connecting a first workpiece having a shank element with a second workpiece having an aperture therethrough, said device comprising a member having a shank portion for extending through the workpiece aperture, and a head portion integral with a trailing end of said shank portion for overlying one side of the apertured workpiece, means providing a bore extending through said head portion and into said shank portion for receiving said shank element of the first workpiece, said member having generally axially extending slot means transversing said head and shank portion and terminating short of the entering shank extremity, said shank portion including a first section adjacent said head portion intersected by said slot means and having a predetermined outer diameter, a plurality of circumferentially spaced generally longitudinally extending, relatively narrow, radially deformable ribs on and projecting laterally of said first section to a limited extent for enabling the device to fit snugly within the workpiece apertures of various diameters, means on said shank portion providing laterally extending relatively rigid shoulder means spaced a predetermined distance from said head and located substantially at entering ends of said ribs for projecting behind the apertured workpiece when the device is applied thereto, said shoulder means integrally joined with and extending circumferentially from opposite sides of a complementary rib, the circumferential extent of said shoulder means being substantially greater than the circumferential width of said rib whereby to provide the required support for said rib, said ribs being deformable and also providing shoulder means engageable behind the apertured workpiece when the apertured workpiece has a thickness less than said predetermined distance, said shoulder means providing a rigid shoulder surface having a diameter at least substantially as great as a diameter of a circle defined by radially outer edges of said ribs for enabling said last named means to protect said ribs against premature deformation during application of the device to the apertured workpiece, and means projecting inwardly from a wall of said bore in the vicinity of said relatively rigid shoulder surface and engageable in a recess provided in said shank element for positively resisting withdrawal of the shank element from the bore.

2. A device as set forth in claim 1 wherein said shank portion in the vicinity of the entering extremity of the slot means is reduced in transverse cross-section so as to increase the flexibility of the wall sections in the second section of the shank.

3. A device of the type described for connecting a first workpiece having a shank element with a second workpiece having an aperture therethrough, said device comprising a member having a shank portion for extending through the workpiece aperture, and a head portion integral with a trailing end of said shank portion for overlying one side of the apertured workpiece, means providing a bore extending through said head portion and into said shank portion for receiving said shank element of the first workpiece, said member having generally axially extending slot means transversing said head and shank portion and terminating short of the entering shank extremity, said shank portion including a first section adjacent said head portion intersected by said slot means and having a predetermined outer diameter, a plurality of circumferentially spaced generally longitudinally extending, relatively narrow, radially deformable ribs on and projecting laterally of said first section to a limited extent for enabling the device to fit snugly within the workpiece apertures of various diameters, means on said shank portion providing laterally extending relatively rigid shoulder means spaced a predetermined distance from said head and located substantially at entering ends of said ribs for projecting behind the apertured workpiece when the device is applied thereto, said shoulder means extending circumferentially between a pair of said ribs and integrally connected therewith so as to provide shoulder surfaces adjacent said ribs having a circumferential extent substantially greater than the circumferential width of said ribs whereby to provide the required support for a complementary rib, said ribs being deformable and also providing shoulder means engageable behind the apertured workpiece when the apertured workpiece has a thickness less than said predetermined distance, said shoulder means providing a rigid shoulder surface having a diameter at least substantially as great as a diameter of a circle defined by radially outer edges of said ribs for enabling said last named means to protect said ribs against premature deformation during application of the device to the apertured workpiece, and means projecting inwardly from a wall of said bore in the vicinity of said relatively rigid shoulder surfaces and engageable in a recess provided in said shank element for positively resisting withdrawal of the shank element from the bore.

References Cited by the Examiner
UNITED STATES PATENTS

| | | |
|---|---|---|
| 2,785,726 | 3/57 | Brush. |
| 2,836,214 | 5/58 | Rapata _____ 151—41.75 |
| 2,976,345 | 3/61 | Whitted _____ 174—153 |
| 3,033,624 | 5/62 | Biesecker. |

EDWARD C. ALLEN, *Primary Examiner.*